(12) United States Patent
Fujii et al.

(10) Patent No.: US 11,185,790 B2
(45) Date of Patent: Nov. 30, 2021

(54) PARTICLE PRODUCTION APPARATUS AND PARTICLE PRODUCTION METHOD

(71) Applicant: OHKAWARA KAKOHKI CO., LTD., Kanagawa (JP)

(72) Inventors: Masashi Fujii, Kanagawa (JP); Yuki Shitara, Kanagawa (JP); Shinobu Suzuki, Kanagawa (JP)

(73) Assignee: OHKAWARA KAKOHKI CO., LTD.

( * ) Notice: Subject to any disclaimer, the term of this patent is extended or adjusted under 35 U.S.C. 154(b) by 35 days.

(21) Appl. No.: 16/503,822

(22) Filed: Jul. 5, 2019

(65) Prior Publication Data

US 2019/0329149 A1    Oct. 31, 2019

Related U.S. Application Data

(63) Continuation of application No. PCT/JP2017/043831, filed on Dec. 6, 2017.

(30) Foreign Application Priority Data

Jan. 6, 2017 (JP) .................................. 2017-001177

(51) Int. Cl.
*B01D 1/18* (2006.01)
*B01J 2/04* (2006.01)

(52) U.S. Cl.
CPC . *B01D 1/18* (2013.01); *B01J 2/04* (2013.01)

(58) Field of Classification Search
CPC .... F26B 5/08; F26B 19/00; B01D 1/18; B01J 2/04
USPC ............................ 34/372, 359, 585, 338, 356
See application file for complete search history.

(56) References Cited

U.S. PATENT DOCUMENTS

| | | | |
|---|---|---|---|
| 2007/0118807 A1* | 5/2007 | Komura | G06F 3/0238 715/764 |
| 2010/0112200 A1* | 5/2010 | Barthel | C08J 3/124 427/185 |
| 2015/0151337 A1* | 6/2015 | Yunfeng | B08B 3/02 134/102.2 |

(Continued)

FOREIGN PATENT DOCUMENTS

| | | | |
|---|---|---|---|
| JP | S62179052 U | | 11/1987 |
| JP | 2006061891 A | * | 3/2006 |
| JP | 2006061891 A | | 3/2006 |

(Continued)

OTHER PUBLICATIONS

PCT/JP2017/043831 International Search Report dated Jan. 23, 2018; 2 pgs.
CN201780082519.0 Office Action dated Jun. 2, 2021, 17 pgs.

*Primary Examiner* — John P McCormack
(74) *Attorney, Agent, or Firm* — Bracewell LLP; Brad Y. Chin (57) ABSTRACT

Embodiments provide a particle production apparatus enabling the production of particles having an intended particle size and a narrow particle size distribution. A particle production apparatus includes a rotary disk and a material supply portion. In the material supply portion, a gas supply port is configured to supply a gas formed outside a material supply port. The gas supplied from the gas supply port directs the material supplied from the material supply port in such a way that the material comes into contact with the surface of the cylindrical portion.

6 Claims, 4 Drawing Sheets

(56) References Cited

U.S. PATENT DOCUMENTS

2018/0151394 A1    5/2018   Hatano et al.

FOREIGN PATENT DOCUMENTS

| JP | 2006326398 | A  | 12/2006 |
| JP | 2007268413 | A  | 10/2007 |
| JP | 2012143983 | A  | 8/2012  |
| WO | 2016190029 | A1 | 12/2016 |

* cited by examiner

PARTICLE PRODUCTION APPARATUS AND PARTICLE PRODUCTION METHOD

CROSS REFERENCE TO RELATED APPLICATIONS

This application claims the benefit of and priority under 35 U.S.C. § 119 to PCT Patent Application No. PCT/JP2017/043831, entitled, "DEVICE FOR PRODUCING PARTICLES AND METHOD FOR PRODUCING PARTICLES," filed on Dec. 6, 2017, which claims priority to Japanese Patent Application No. JP2017-001177, having the same title as the PCT patent application," filed on Jan. 6, 2017, each of which is hereby incorporated by reference in their entirety into this application.

BACKGROUND

Field

Embodiments relate to a particle production apparatus and a particle production method. More specifically, embodiments relates to a particle production apparatus and a particle production method enabling the production of particles having an intended particle size and a narrow particle size distribution.

Description of the Related Art

As a conventional apparatus for producing ceramic microparticles and the like, a centrifugal spray dryer is known. As such a spray dryer, for example, a spray dryer including a spray disk for spraying a material and a spray drying chamber storing the spray disk has been disclosed (for example, see Patent Document 1).

CITATION LIST

Patent Documents

[Patent Document 1] JP-A-2006-326398

SUMMARY

The spray dryer disclosed in Patent Document 1 is still difficult to sufficiently suppress the variation in particle size of particles and has a room for further improvement. Hence, there is a great need for development of a particle production apparatus enabling the production of particles having an intended particle size (average particle size) and a narrow particle size distribution (i.e., a lower variation in particle size of the particles).

For a spray cool particle production apparatus, as with the spray dryer, there is a great need for development of a spray cool particle production apparatus enabling the production of particles having an intended particle size and a narrow particle size distribution.

Embodiments solve such conventional problems as described above and provide a particle production apparatus and a particle production method enabling the production of particles having an intended particle size and a narrow particle size distribution.

Embodiments provide the following particle production apparatus and the particle production method.

According to at least embodiment, there is provided a particle production apparatus including a rotary disk having a plate portion and a cylindrical portion extending from the plate portion, and a material supply portion located above the rotary disk and having a material supply port configured to supply a material. In the material supply portion, a gas supply port configured to supply a gas is formed outside the material supply port, and the gas supplied from the gas supply port directs the material supplied from the material supply port in such a way that the material comes into contact with a surface of the cylindrical portion.

According to at least one embodiment, each of the material supply port and the gas supply port is an annular slit, and the material supply port is configured to supply the material in a film shape and an annular shape.

According to at least one embodiment, the material supply port has a larger open width than an open width of the gas supply port.

According to at least one embodiment, the material supply portion includes a convex portion having an approach face configured to guide the material to come into contact with the surface of the cylindrical portion.

According to at least one embodiment, the approach face of the convex portion has a length of 1.5 mm or more, and the length is 6 to 25 times the open width of the gas supply port.

According to at least one embodiment, the material flows on a top face of the plate portion, and the top face has a flat face parallel with a rotation direction of the rotary disk.

According to at least one embodiment, the material is ejected from the material supply port in a vertical direction.

According to another embodiment, there is provided a particle production method using the particle production apparatus discussed above and described in more detail below, the particle production method includes a material supplying step of supplying the material from the material supply port while the gas is supplied from the gas supply port in such a way that the gas directs the material to come into contact with a surface of the cylindrical portion, and a particle forming step of bringing the material into contact with the surface of the cylindrical portion, allowing the material to form a liquid film on the rotary disk, and discharging the material as particles out of the rotary disk. In the material supplying step, a mass ratio of the gas to the material is 0.1 to 1.5.

The particle production apparatus according to various embodiments enables the production of particles having an intended particle size (average particle size) and a narrow particle size distribution.

The particle production method according to various embodiments uses the particle production apparatus discussed above and described in more detail below and thus enables the production of particles having an intended particle size (average particle size) and a narrow particle size distribution.

DETAILED DESCRIPTION

Modes for carrying out the various embodiments will now be described, but the invention is not intended to be limited to the following embodiments. In other words, it should be understood that those in which changes, improvements, or the like are appropriately added to the following embodiments based on ordinary knowledge of a person skilled in the art are also included in the scope of the various embodiments without departing from the spirit of the invention.

Figure 1:
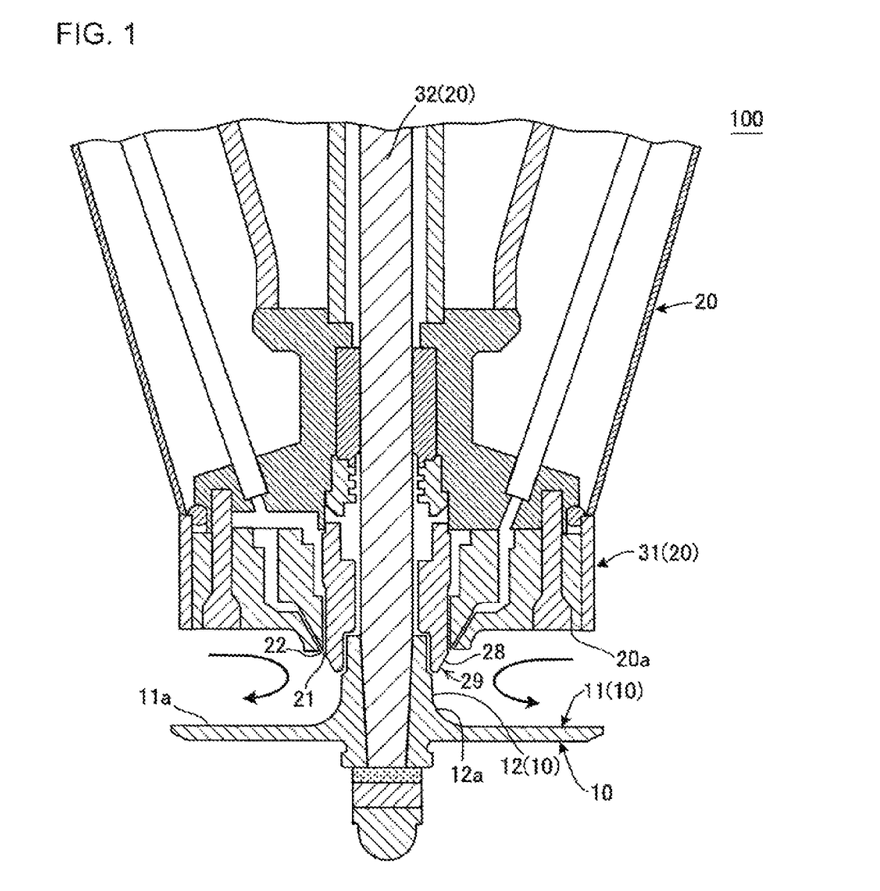
FIG. 1 is a sectional view schematically showing an embodiment of a particle production apparatus according to an embodiment.
Figure 2:
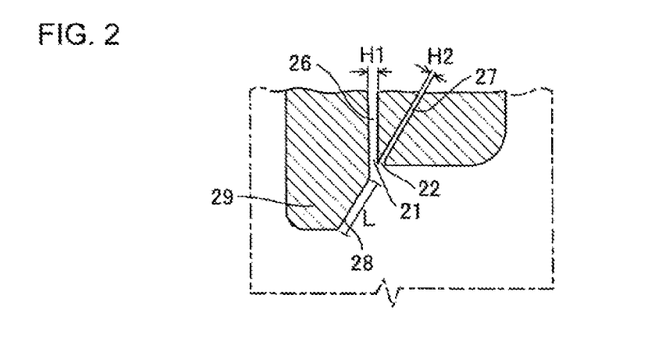
FIG. 2 is an enlarged sectional view schematically showing a leading end of a material supply portion of the particle production apparatus shown in FIG. 1.

(1) Particle Production Apparatus:

An embodiment of a particle production apparatus is a particle production apparatus 100 shown in FIG. 1. The particle production apparatus 100 includes a rotary disk 10 having a plate portion 11 and a cylindrical portion 12 extending from the plate portion 11 and includes a material supply portion 20 located above the rotary disk 10 and having a material supply port 21 configured to supply a material. In the material supply portion 20, a gas supply port 22 configured to supply a gas is formed outside the material supply port 21, and the gas supplied from the gas supply port 22 directs the material supplied from the material supply port 21 in such a way that the material comes into contact with a surface 12*a* of the cylindrical portion 12.

The particle production apparatus 100 enables the production of particles having an intended particle size (average particle size) and a narrow particle size distribution.

Conventionally, a material supplied to a rotary disk is so supplied as to flow down a plate portion of the rotary disk, then forms a film on a top face of the plate portion, and flows toward the edge of the rotary disk. Next, the material is discharged out of the rotary disk when particulate materials (liquid drops) are formed. During this process, resulting particles unfortunately obtain a large variation in particle size due to the following reasons.

First, one reason of causing the variation in particle size of particles is popping of a material supplied onto a rotary disk due to the surface tension of the material and the shear force of the rotating rotary disk (spray disk). According to an embodiment, to suppress the popping of a material, (1) a gas is used to direct a material ejected from a material supply portion before the material reaches a cylindrical portion, and then (2) on a rotary disk, a force is so applied that the gas presses the material against the rotary disk. In the process, various materials can be used and have various surface tensions. In addition, various particle sizes are intended, and the rotary disk is set at various rotation rates. Even in such conditions, by appropriately changing energy amounts of a gas (a flow amount and a flow rate of a gas), a material can be prevented from causing popping (i.e., flowing conditions of a material can be controlled).

Popping means a state in which a material appears to hop or roll on a rotary disk, and when popping is caused, a part of the supplied material does not form a liquid film on a rotary disk. A material causing popping is also referred to as a material splashing.

In addition, when popping is suppressed, a material is prevented from adhering to and drying on a material supply portion or a rotary disk to generate deformed substances. The deformed substances are required to be removed in many cases for higher quality of recent products. Although comparatively large deformed substances can be removed through a sieve or the like, it is extremely difficult to remove substances having sizes substantially the same as or smaller than an intended particle size, through a sieve or the like.

Another reason of causing the variation in particle size of particles is a larger variation in thickness of a liquid film flowing on the top face of a plate portion. The larger variation in thickness of a liquid film is supposed to be caused by an air flow generated between a material supply portion and a rotary disk.

In other words, a turbulent air flow may affect a material before reaching the plate portion. The "turbulent air flow" includes an air flow generated by rotation of a rotary disk at high speed and specifically includes an air flow that gathers around the center of the rotary disk and then flows outside the rotary disk. FIG. 5 shows an apparatus 200 including a conventional rotary disk 101. On the rotary disk 101, as shown by arrows, air gathers around (is sucked toward) the center of the rotary disk 101, then flows on the rotary disk 101, and flashes outside the rotary disk 101. On the air flow, for example, a material before reaching the rotary disk may land on the outer region of the rotary disk (a region with a high shear force) by a turbulent flow, or a material before reaching the rotary disk may form liquid drops. In such a condition, a material is likely to cause popping. The thickness of the liquid film gradually decreases from the center to the edge of the rotary disk. In the present description, the "turbulent flow" includes, in addition to the meaning of a turbulent flow in the fluid mechanics, a turbulent flow of air. For example, the turbulent flow includes irregular air flows, fluctuating air flows, air flows at various flow speeds, and a large flow with an eddy.

The apparatus 200 includes a material supply portion 201 above the rotary disk 101, and the material supply portion 201 has a material supply path 300 and a rotating shaft 301.

Embodiments can prevent a material from causing popping and prevent a material from being affected by a turbulent air flow, thus preventing particles from having a larger variation in particle size.

In the present description, "a gas directing a material" means that a gas changes the flowing direction of a material to an intended direction (alters the flowing direction of a material).

(1-1) Material Supply Portion:

The material supply portion 20 is located above the rotary disk 10 and has a material supply port 21 configured to supply a material. More specifically, the material supply portion 20 includes an apparatus main body 31 having, on an end face 20*a*, the material supply port 21 configured to supply a material and includes a rotating shaft 32 protruding from the end face 20*a* of the apparatus main body 31 and configured to rotate around the axis of the protruding direction. The material supply portion 20 further has a material supply path 26 communicating with the material supply port 21, and a material is to pass through the material supply path 26. The "material" means a material in the liquid form (liquid material) and includes a slurry and the like containing solid particles.

The material supply portion 20 further has, outside the material supply port 21, a gas supply port 22 configured to supply a gas. The material supply portion 20 also has a gas supply path 27 communicating with the gas supply port 22, and a gas for directing the material is supplied through the gas supply path 27. The gas supplied from the gas supply port not only directs the material but also functions as an air layer for preventing the material from causing popping or for suppressing a turbulent air flow. In other words, although an air flow from the outside to the center of the rotary disk (arrows in FIG. 1) can be generated, the gas supplied from the gas supply port can prevent the air flow from causing defects including material popping.

Each of the material supply port and the gas supply port is preferably an annular slit. The annular slit is more preferably circular. From the material supply port having such a shape, the material in a film shape and an annular shape is supplied. Each of the material supply port and the gas supply port as the circular slit is preferably a circle around the central axis of the rotating shaft. When having the circular slits, the apparatus can more satisfactory prevent material popping and can form a more uniform liquid film on the rotary disk. As a result, the apparatus enables the production of particles having a narrower particle size distribution.

The material supply port as an annular slit preferably has a larger open width H1 than the open width H2 of the gas supply port as an annular slit. With such a design, the apparatus can satisfactory prevent material popping and can form a more uniform liquid film.

The material is preferably ejected from the material supply port in the vertical direction. After the material is ejected (supplied) in such a direction, the direction thereof is preferably changed by the gas supplied from the gas supply port. By such a control, the direction of the material ejected from the material supply port is easily adjusted. If a material ejected from a material supply port is intended to come into direct contact with a cylindrical portion, the material before reaching the cylindrical portion is affected by the above mentioned "turbulent air flow" and forms a wavy liquid film microscopically. Hence, such a condition may cause a large variation in particle size of liquid drops unfortunately. The gas supplied from the gas supply port therefore not only directs the material but also functions to prevent the material from being affected by the above "turbulent air flow".

The material supply portion 20 preferably includes a convex portion 29 having an approach face 28 configured to guide the material to come into contact with the surface 12a of the cylindrical portion 12 of the rotary disk 10 and to flow along the surface 12a. With such a convex portion 29, the apparatus can more certainly set the flowing direction of the material ejected from the material supply port. In addition, an ejector effect is generated, thus the opening of the material supply port has a negative pressure, and the material is supplied in a more uniform thickness. The approach face of the convex portion is a tapered face having a smaller diameter toward the rotary disk.

The angle of the approach face of the convex portion can be appropriately set and is preferably the same as the ejection angle of the gas supplied from the gas supply port.

The angle of the directed material is not limited to particular angles, and the angle to the central axis of the rotating shaft 32 can be 0 to 60° or 10 to 60° and can be preferably 15 to 45°. When the angle of the material is within the range, the material can be satisfactory prevented from causing popping. If the angle of the material exceeds the upper limit, the material may cause popping. The lower limit of the angle of the material can be about 10° from the viewpoint of easy production of the apparatus, for example.

The approach face of the convex portion preferably has a length L of 1.5 mm or more. In this condition, the length L of the approach face of the convex portion is preferably 6 to 25 times the open width H2 of the gas supply port and more preferably 10 to 20 times. When the approach face has a length L within such a range, the material has a more uniform thickness. If the approach face of the convex portion has a length L less than the lower limit rate, a turbulent flow may be generated around the material supply port, and the ejector effect may not be sufficiently achieved. In addition, the material is likely to flow mainly from a position facilitating the flow (the supplied amount of the material greatly varies). This may cause a variation of a liquid film, and thus may be difficult to give the material having a uniform thickness. If the approach face of the convex portion has a length L more than the upper limit rate, the distance of the material to the rotary disk becomes long, thus the material is highly likely to cause popping, or the material is highly likely to be affected by a turbulent flow. If the approach face of the convex portion has a length L of less than 1.5 mm, the advantageous effects of the various embodiments may not be sufficiently achieved.

The length of the approach face of the convex portion means the length of the approach face in such a cross section (a cross section orthogonal to the rotation direction of the rotary disk) as shown in FIG. 1. The length of the approach face of the convex portion is intended to mean the length in the above cross section, on the plane extending in the same direction as the supply direction (ejecting angle) of the gas supplied from the gas supply port.

(1-2) Rotary Disk:

The rotary disk 10 includes a plate portion 11 and a cylindrical portion 12 extending from the plate portion 11. The cylindrical portion 12 is a portion extending toward the end face 20a while partially covering the rotating shaft 32. According to the various embodiments, the "cylindrical portion" is a portion protruding from the plate portion 11 toward the end face 20a of the material supply portion 20 and is not specifically limited as long as the material is supplied so as to come into contact with the surface of the cylindrical portion.

The rotary disk 10 is connected to the leading end of the rotating shaft 32 rotated by a driving unit and is to rotate. Rotation of the rotating shaft 32 around the axis thereof allows the rotary disk 10 to rotate. The material supplied onto such a rotary disk 10 starts to rotate according to the rotation of the rotary disk and moves toward the outside of the rotary disk due to the centrifugal force. As the material moves to the outside of the rotary disk, the material has higher speeds (both the speed in the rotation direction and the moving speed to the outside) to form a thinner liquid film (i.e., the liquid film has a smaller thickness from the center to the edge of the rotary disk), and is discharged as liquid drops from the edge. In other words, when the material is supplied from the material supply portion 20 to the rotating rotary disk 10, liquid drops of the material are sprayed from the rotary disk 10 due to the centrifugal force generated by the rotation of the rotary disk 10. Hence, by supplying the material not to the plate portion 11 of the rotary disk 10 rotating at a high speed but to the surface of the cylindrical portion 12, the impact by contact of the material with the rotary disk 10 can be reduced. As a result, the material can be prevented from causing popping, and the liquid film formed on the rotary disk 10 can be prevented from having various thicknesses (i.e., the liquid film can be prevented from having a wavy surface when the liquid film is observed in a cross section taken along the thickness direction of the liquid film, for example). In other words, by allowing the material to flow so as to come into contact with the surface of the cylindrical portion 12, problems such as a wavy surface of a liquid film can be more certainly prevented.

The material flows on the top face 11a of the plate portion 11, and the top face preferably has a flat face (a smooth face), preferably has a flat face extending along the rotation direction of the rotary disk 10, and more preferably has a flat face parallel with the rotation direction of the rotary disk 10. When the top face 11a has such a flat face as above, the liquid film formed on the rotary disk 10 is unlikely to have a wavy surface, and the liquid film is so formed as to have a thickness that gradually decreases from the center to the edge. The top face 11a in FIG. 1 is a flat face parallel with the rotation direction of the rotary disk 10.

Figure 5:
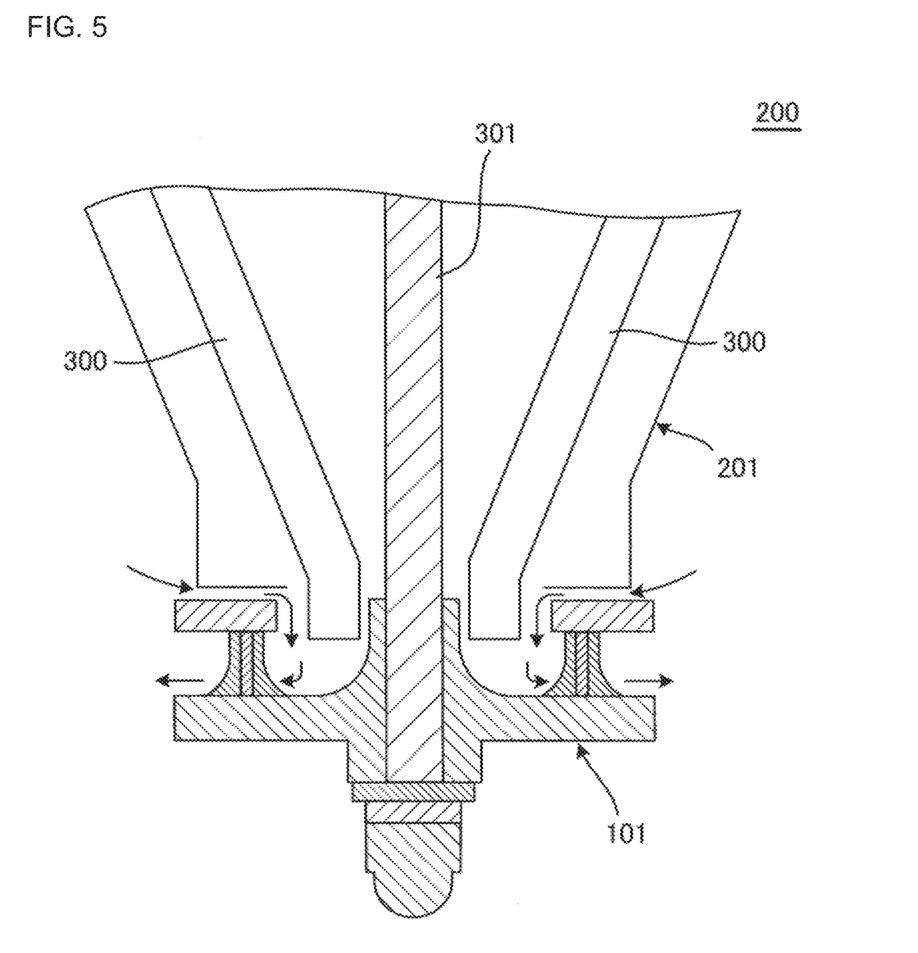
FIG. 5 is a diagram schematically illustrating an air flow in a conventional apparatus.

As the rotary disk, a conventionally known rotary disk can be appropriately adopted. For example, a rotary disk having a plurality of spray rollers (such as the rotary disk 101 of the apparatus 200 shown in FIG. 5) may be adopted, or a rotary disk having no spray roller as shown in FIG. 1 (what is called a dish-shaped rotary disk) may be adopted. A rotary disk having no spray roller as shown in FIG. 1 is preferred. When such a rotary disk is adopted, particles having a narrower particle size distribution can be produced.

The dish-shaped rotary disk is, for example, a rotary disk including a plate portion having a flat face extending along the rotation direction of the rotary disk. "Extending along the rotation direction" includes not only the case parallel with the rotation direction but also the case inclining to the rotation direction (the case of a tapered face).

Figure 6:
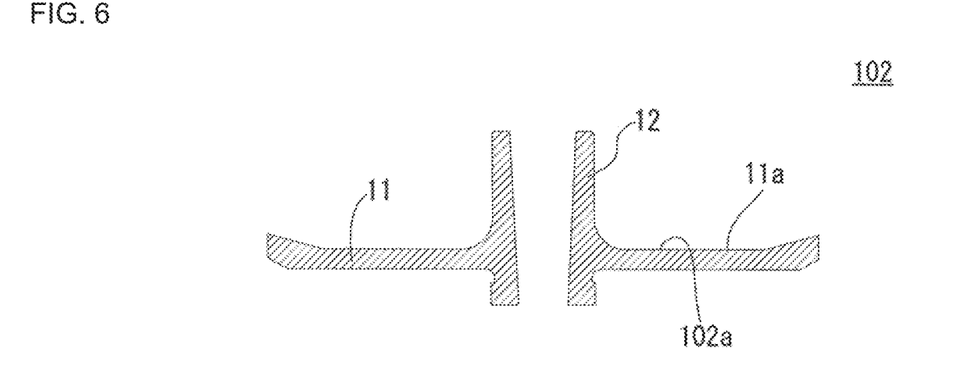
FIG. 6 is a sectional view schematically showing a rotary disk in the particle production apparatus according to an embodiment.
Figure 7:
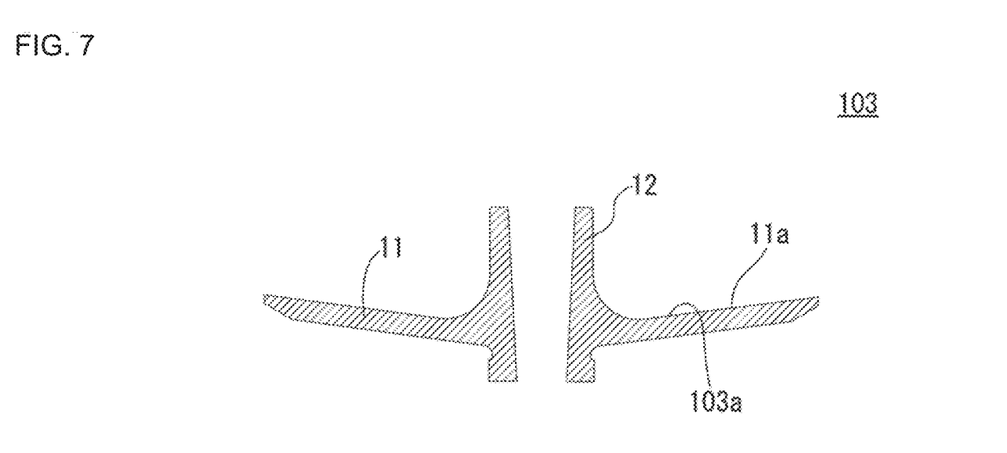
FIG. 7 is a sectional view schematically showing a rotary disk in the particle production apparatus according to an embodiment.
Figure 8:
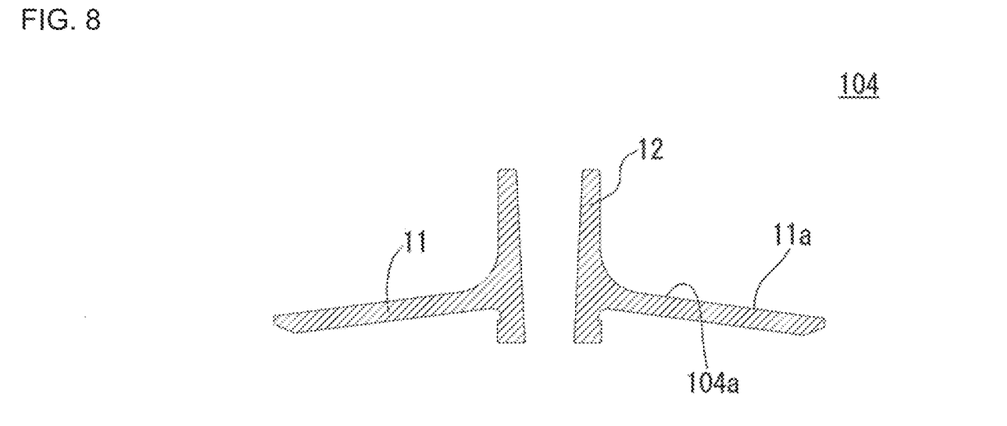
FIG. 8 is a sectional view schematically showing a rotary disk in the particle production apparatus according to an embodiment.

Examples of the dish-shaped rotary disk include rotary disks 102 to 104 shown in FIG. 6 to FIG. 8. The rotary disk 102 shown in FIG. 6 has the shape in which a plate portion 11 has an upward peripheral part as compared with the rotary disk 10 shown in FIG. 1, and a top face 11a in FIG. 6 has a flat face 102a parallel with the rotation direction of the rotary disk 102. The rotary disk 103 shown in FIG. 7 has the shape in which a plate portion 11 extends upwardly toward the peripheral part thereof, and a top face 11a in FIG. 7 has a flat face 103a extending along the rotation direction of the rotary disk 102. The flat face 103a is thus a tapered face. The rotary disk 104 shown in FIG. 8 has the shape in which a plate portion 11 extends downwardly toward the peripheral part thereof. The plate portion 11 thus has an umbrella shape. A top face 11a in FIG. 8 has a flat face 104a extending along the rotation direction of the rotary disk 104. The flat face 104a is thus a tapered face. FIG. 6 to FIG. 8 are views schematically showing cross sections as with FIG. 1 and only show the rotary disks.

The rotary disk typically has a diameter of about 50 to 350 mm.

(1-3) Other Members:

Outside the rotary disk, a heat dryer configured to heat and dry the particulate materials (liquid drops) sprayed from the rotary disk may be included.

As the heat dryer, a heat dryer including an interior space in which the rotary disk is placed and further including a gas supply portion for supplying a hot wind (high-temperature gas) into the interior space can be used. On the bottom of the heat dryer, a recovery pocket for collecting the dried and solidified particulate materials can be provided.

The material applied to the particle production apparatus according to an embodiment is not specifically limited. For example, fine chemical materials, electronic component materials, battery materials, foods, drugs, and other various materials can be used.

The gas used in the particle production apparatus according to an embodiment is not specifically limited. For example, water vapor, compressed air, nitrogen gas, argon gas, carbon dioxide gas, or the like can be appropriately used.

(2) Particle Production Method (Usage of the Particle Production Apparatus According to an Embodiment):

A particle production method according to an embodiment is a particle production method using the particle production apparatus and includes a material supplying step of supplying a material from the material supply port while a gas is supplied from the gas supply port in such a way that the gas directs the material to come into contact with a surface of the cylindrical portion, and a particle forming step of bringing the material into contact with the surface of the cylindrical portion, allowing the material to form a liquid film on the rotary disk, and discharging the material as particles out of the rotary disk. In the material supplying step, the mass ratio of the gas to the material (the mass of the gas/the mass of the material) is 0.1 to 1.5.

Such a particle production method enables the production of particles having an intended particle size and a narrow particle size distribution The mass of the material is the value when the mass of the material supplied within a predetermined period of time is determined (liquid specific gravity). The mass of the gas is the value when the amount of the gas supplied within the same measurement period of time is measured by a hot wire type airflow meter or the like and then is converted into the mass.

(2-1) Material Supplying Step:

In the step, a material is supplied from the material supply port while a gas is supplied from the gas supply port in such a way as the gas directs the material to come into contact with the surface of the cylindrical portion.

In the step, the mass ratio of the gas to the material (the mass of the gas/the mass of the material) is 0.1 to 1.5 as described above, preferably 0.4 to 1.3, and more preferably 0.6 to 1.0. In such a condition, particles having an average particle size within an intended range can be produced, and particles having a narrow particle size distribution can be produced. If the ratio is less than the lower limit, the material may cause popping. If the ratio exceeds the upper limit, the rotary disk to which the material is blown may be worn. In addition, the supplied gas is likely to waste.

In the step, the material (liquid material) is not specifically limited, and a slurry or the like can be used. As the liquid material, a material having a liquid viscosity of 1 to 10,000 mPa·s can be used, a material having a liquid viscosity of 1 to 1,000 mPa·s is preferably used, a material having a liquid viscosity of 1 to 500 mPa·s is more preferably used, and a material having a liquid viscosity of 1 to 350 mPa·s is particularly preferably used. The liquid viscosity of the material is not limited to the above range.

The liquid viscosity of the material is determined with a Brookfield viscometer.

The supply pressure of the gas is not limited to particular values, and can be 0.005 to 0.2 MPa or 0.06 to 0.14 MPa. By adopting such conditions, particles having an average particle size within an intended range can be produced, and particles having a narrow particle size distribution can be produced.

(2-2) Particle Forming Step:

In the step, the material is brought into contact with the surface of the cylindrical portion, flows along the surface, then forms a liquid film on the rotary disk, and is discharged as particles out of the rotary disk.

In the step, the rotation rate of the rotary disk is not limited to particular values and can be appropriately controlled. For example, the rotation rate of the rotary disk can be set at 5,000 to 25,000 rpm or at 7,500 to 18,500 rpm. By setting the rotation rate of the rotary disk within the above range, particles having an average particle size within an intended range can be produced, and particles having a narrow particle size distribution can be produced.

The particle production apparatus according to an embodiment can also be used as a spray cool particle production apparatus (spray cooler). With the spray cooler, a substance, such as a wax melted by heat, can be sprayed into microparticles, and the microparticles can be cooled and solidified, yielding particles. The spray cooler enables the production of microcapsules by mixing a core substance, such as a medicinal agent, in a melted substance.

EXAMPLES

Various embodiments will next be specifically described on the basis of examples and comparative examples, but the various embodiments are not intended to be limited to these examples and comparative examples.

Example 1

A particle production apparatus as shown in FIG. 1 was used to produce particles. The particle production apparatus included a rotary disk having a flat plate portion and a cylindrical portion extending from the plate portion. The plate portion had a top face on which a material flowed, and the top face was a flat face parallel with the rotation direction of the rotary disk.

Each of the material supply port and the gas supply port was a circular slit. The material supply port had a larger open width than the open width of the gas supply port. Specifically, the open width of the material supply port was 0.5 mm, and the open width of the gas supply port was 0.25 mm.

A material was ejected from the material supply port in the vertical direction and then was directed by a gas at a predetermined angle. The angle of the directed material was 15° to the central axis of the rotating shaft.

The material supply portion of the particle production apparatus included a convex portion having an approach face for guiding the material to come into contact with the surface of the cylindrical portion, and the angle of the approach face was 15° to the central axis of the rotating shaft. The approach face of the convex portion had a length of 3.5 mm, and the length was 14 times the open width of the gas supply port (circular slit).

The material directed by the gas (the material in a film shape and an annular shape) was so supplied as to come into contact with the surface of the cylindrical portion. In the process, the rotary disk had a diameter of 125 mm, and the rotation rate thereof was 8,000 rpm.

As the material, a mixed liquid of alumina and water (a viscosity of 265 mPa·s) was used and supplied at 55 kg/hour at a supply temperature of 19° C. As the gas, air was used. The mass ratio of the gas to the material was 0.8. The supply pressure of the air was 0.1 MPa. The mass of the gas was determined as the amount of the gas supplied within the same measurement period of time, using a hot wire type airflow meter.

Figure 3:
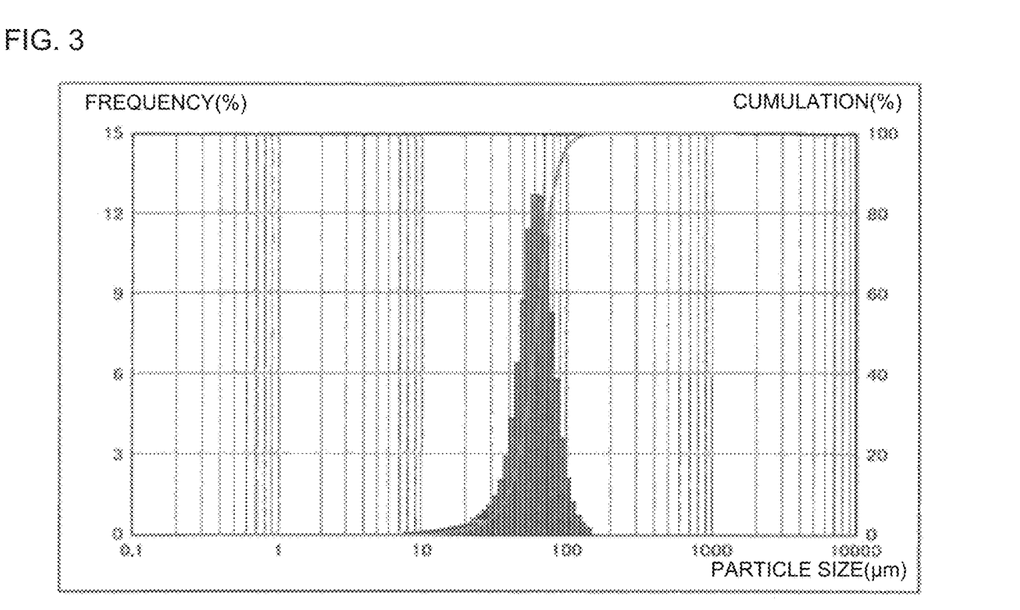
FIG. 3 shows a particle size distribution in Example 1.

The particle size distribution of the produced particles was determined using a Microtrac, Optical Table MT3200 (DRY) manufactured by NIKKISO. The measurement result of the particle size distribution is shown in FIG. 3. "DRY" means measurement in a dry system.

In the obtained particle size distribution, the 50% cumulative particle size was 60 μm, and the standard deviation (SD) was 17.08 μm. In the present description, the standard deviation (SD) was calculated in accordance with the formula: (d84%-d16%)/2, where d84% was the particle size (μm) at 84% on the cumulative curve, and d16% is the particle size (μm) at 16% on the cumulative curve.

In the example, neither material adhesion caused by popping of the material nor a large variation in thickness of the liquid film was observed.

Example 2

Of the conditions in Example 1, the length of the approach face of the convex portion was set to "5.6 times" the open width of the gas supply port (circular slit), and a slight variation in thickness of the liquid film was visually observed.

From the result, it is supposed that the above condition does not so widen the particle size distribution as by conventional apparatuses but is likely to widen the particle size distribution.

Comparative Example 1

A conventional particle production apparatus (an "OCA111" atomizer manufactured by Ohkawara Kakohki Co., Ltd. equipped with a "Disk MC-125" manufactured by Ohkawara Kakohki Co., Ltd.) was used to produce particles.

As the material, substantially the same material as in Example 1 was used, and the material was supplied from two liquid supplying pipes at 55 kg/hour at a supply temperature of 19° C. The rotary disk had a diameter of 125 mm, and the rotation rate thereof was 8,800 rpm.

Figure 4:
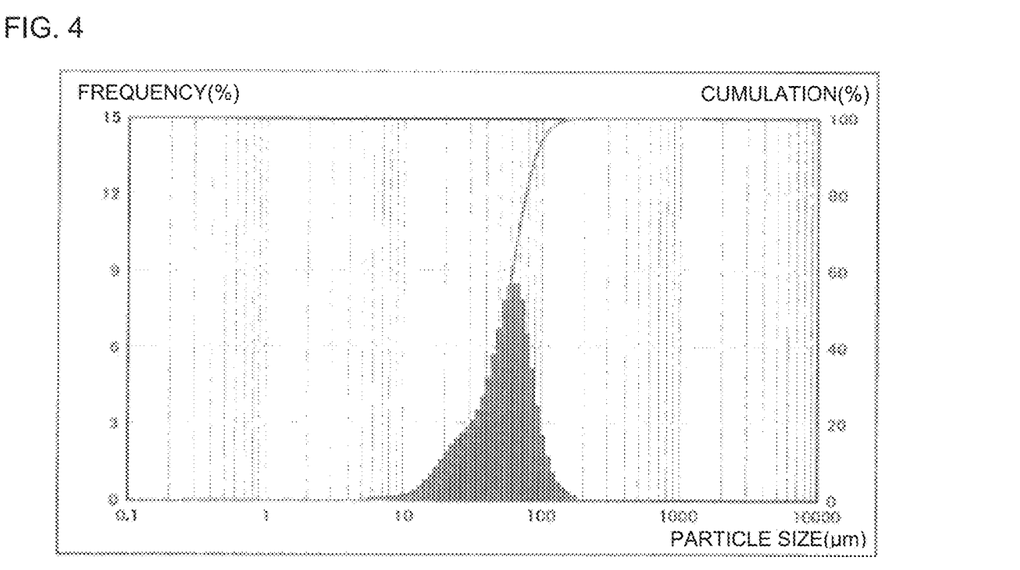
FIG. 4 shows a particle size distribution in Comparative Example 1.

The particle size distribution of the produced particles was determined in the same manner as in Example 1. The measurement result of the particle size distribution is shown in FIG. 4.

In the obtained particle size distribution, the 50% cumulative particle size was 55 μm, and the standard deviation (SD) was 25.38 μm.

The results of Examples 1 and 2 reveal that use of the particle production apparatus according to an embodiment enables the production of particles having an intended particle size (an average particle size of about 60 μm) and a narrower particle size distribution than the case using the conventional apparatus (Comparative Example 1).

INDUSTRIAL APPLICABILITY

The particle production apparatus according to an embodiment can be used as an apparatus for producing microparticles or the like. The particle production method according to an embodiment can be adopted as a production method of microparticles or the like.

DESCRIPTION OF REFERENCE NUMERALS

10, 101, 102, 103, 104: rotary disk, 11: plate portion, 11a: top face, 12: cylindrical portion, 12a: surface of cylindrical portion, 20: material supply portion, 20a: end face of material supply portion, 21: material supply port, 22: gas supply port, 26: material supply path, 27: gas supply path, 28: approach face, 29: convex portion, 31: apparatus main body, 32: rotating shaft, 100: particle production apparatus, 200: (conventional) apparatus, 102a, 103a, 104a: flat face, 201: material supply portion, 300: material supply path, 301: rotating shaft, H1: open width of material supply port, H2: open width of gas supply port.

The invention claimed is:

1. A particle production apparatus, comprising:
    a rotary disk comprising a plate portion and a cylindrical portion extending from the plate portion; and
    a material supply portion located above the rotary disk and comprising a material supply port configured to supply a material,
    wherein, in the material supply portion, a gas supply port is configured to supply a gas is formed outside the material supply port,
    wherein the gas supplied from the gas supply port directs the material supplied from the material supply port in such a way that the material comes into contact with a surface of the cylindrical portion,
    wherein each of the material supply port and the gas supply port is an annular slit, and the material supply port is configured to supply the material in a film shape and an annular shape, and
    wherein the material supply portion comprises a convex portion having an approach face configured to guide the material to come into contact with the surface of the cylindrical portion.

2. The particle production apparatus according to claim 1, wherein the material supply port has a larger open width than an open width of the gas supply port.

3. The particle production apparatus according to claim 1, wherein the approach face of the convex portion has a length of 1.5 mm or more, and the length is 6 to 25 times the open width of the gas supply port.

4. The particle production apparatus according to claim 1, wherein the material flows on a top face of the plate portion, and the top face comprises a flat face parallel with a rotation direction of the rotary disk.

5. The particle production apparatus according to any one of claim 1, wherein the material is ejected from the material supply port in a vertical direction.

6. A particle production method using the particle production apparatus according to claim 1, the particle production method comprising:
    a material supplying step of supplying the material from the material supply port while the gas is supplied from the gas supply port in such a way that the gas directs the material to come into contact with a surface of the cylindrical portion; and
    a particle forming step of bringing the material into contact with the surface of the cylindrical portion, allowing the material to form a liquid film on the rotary disk, and discharging the material as particles out of the rotary disk,
    wherein in the material supplying step, a mass ratio of the gas to the material is 0.1 to 1.5.

* * * * *